United States Patent
Miyoshi et al.

(10) Patent No.: US 8,340,033 B2
(45) Date of Patent: Dec. 25, 2012

(54) WIRELESS COMMUNICATION DEVICE AND EMERGENCY SIGNAL TRANSMISSION METHOD

(75) Inventors: Kenichi Miyoshi, Kanagawa (JP); Ayako Horiuchi, Kanagawa (JP); Yuichi Kobayakawa, Cupertino, CA (US); Katsuhiko Hiramatsu, Leuven (BG)

(73) Assignee: Panasonic Corporation, Osaka (JP)

( * ) Notice: Subject to any disclaimer, the term of this patent is extended or adjusted under 35 U.S.C. 154(b) by 334 days.

(21) Appl. No.: 12/532,341

(22) PCT Filed: Mar. 28, 2008

(86) PCT No.: PCT/JP2008/000790
§ 371 (c)(1),
(2), (4) Date: Sep. 21, 2009

(87) PCT Pub. No.: WO2008/129845
PCT Pub. Date: Oct. 30, 2008

(65) Prior Publication Data
US 2010/0093304 A1    Apr. 15, 2010

(30) Foreign Application Priority Data
Mar. 28, 2007    (JP) .................................. 2007-085387

(51) Int. Cl.
*H04W 4/00*    (2009.01)
(52) U.S. Cl. ...................................................... 370/329
(58) Field of Classification Search .................... 370/329
See application file for complete search history.

(56) References Cited

U.S. PATENT DOCUMENTS

| | | | |
|---|---|---|---|
| 6,611,509 B1* | 8/2003 | Hayashi et al. ............... | 370/335 |
| 7,106,689 B1* | 9/2006 | Sudo ............................. | 370/208 |
| 2001/0021197 A1* | 9/2001 | Foore et al. ................... | 370/468 |
| 2003/0045259 A1* | 3/2003 | Kimata ......................... | 455/260 |
| 2004/0136408 A1 | 7/2004 | Tomobe | |
| 2006/0062140 A1* | 3/2006 | Sudo ............................. | 370/203 |
| 2007/0036064 A1* | 2/2007 | Song et al. ................... | 370/206 |
| 2007/0232349 A1* | 10/2007 | Jones et al. ................ | 455/552.1 |
| 2008/0158060 A1* | 7/2008 | Lee et al. ...................... | 342/450 |
| 2010/0273494 A1* | 10/2010 | Iwai et al. ..................... | 455/450 |

FOREIGN PATENT DOCUMENTS

| | | |
|---|---|---|
| EP | 1 033 853 | 9/2000 |
| EP | 1 179 902 | 2/2002 |
| JP | 2002-111576 | 4/2002 |
| JP | 2005-020792 | 1/2005 |
| JP | 2006-157797 | 6/2006 |
| JP | 2006-352191 | 12/2006 |
| JP | 2008-199553 | 8/2008 |

OTHER PUBLICATIONS

International Search Report dated Jul. 15, 2008.
Extended European Search Report dated Aug. 4, 2011.
Japanese Office Action dated Apr. 17, 2012.

* cited by examiner

*Primary Examiner* — Derrick Ferris
*Assistant Examiner* — Shaq Taha
(74) *Attorney, Agent, or Firm* — Dickinson Wright PLLC

(57) ABSTRACT

Provided is a wireless communication device which can transmit an emergency signal without deteriorating data transmission efficiency. In the device, a modulating section (105) performs modulation processing to an emergency signal and generates an emergency signal symbol, an arranging section (106) arranges the emergency signal symbol at a frequency of a guard carrier wherein a normal signal is not arranged, a diffusion section (107) performs diffusion processing to the emergency signal symbol by using an emergency signal diffusion code, and a wireless transmission section (108) performs transmission processing to the diffused emergency signal symbol and transmits the symbol from an antenna (109).

5 Claims, 8 Drawing Sheets

US 8,340,033 B2

WIRELESS COMMUNICATION DEVICE AND EMERGENCY SIGNAL TRANSMISSION METHOD

TECHNICAL FIELD

The present invention relates to a radio communication apparatus and an emergency signal transmission method.

BACKGROUND ART

In the field of radio communication, especially in mobile communication, a variety of information such as image and data in addition to voice has become an object of transmission in recent years. The demand for higher-speed transmission is expected to further increase in the future, and, to perform high-speed transmission, a radio transmission technology is required that utilizes limited frequency resources more effectively and achieves high transmission efficiency.

OFDM (Orthogonal Frequency Division Multiplexing) is one of radio transmission techniques to meet the demand (e.g. see Non-Patent Document 1). It is known that OFDM features high frequency efficiency and low inter-symbol interference under a multipath environment and is effective to improve transmission efficiency. Particularly, in OFDM, the frequencies of a plurality of subcarriers where data is mapped are orthogonal to each other, so that it is possible to achieve best frequency efficiency in multicarrier communications and OFDM can be realized multicarrier communication in a relatively simple hardware configuration. For this reason, OFDM is attracted attention as a communication method to be employed in mobile communications, and is studied variously.

Non-Patent Document 1: WS No. 197, "OFDM modulation technology for digital broadcast/mobile communication," published by Triceps Corporation, on Mar. 7, 2000

DISCLOSURE OF INVENTION

Problems to be Solved by the Invention

When an emergency happens to a user of a radio communication mobile station apparatus (hereinafter "mobile station"), for example, when a user get lost in the snowy mountains, it is possible for the user to utilize mobile communications as a contact means to call for help and to transmit an emergency signal from the mobile station to a radio communication base station apparatus (hereinafter "base station").

Further, when OFDM is employed in mobile communications, to transmit an emergency signal from a mobile station to a base station, it is possible to keep a special channel for dedicated use by emergency signals besides data channels in advance.

However, the mobile station transmits an emergency signal to the base station very few, and therefore it is useless to keep a special channel for dedicated used by emergency signals in advance. Further, if a special channel for dedicated use by emergency signals is always kept, the efficiency of data transmission is reduced because data cannot be transmitted using that special channel.

It is therefore an object of the present invention to provide a radio communication apparatus and emergency signal transmission method that is able to transmit an emergency signal without reducing data transmission efficiency.

Means for Solving the Problem

The radio communication apparatus adopts a configuration including: a mapping section that maps an emergency signal to a specific frequency to which a regular signal is not mapped in a frequency band of a multicarrier signal; and a transmitting section that transmits the emergency signal mapped to the specific frequency.

Advantageous Effects of Invention

According to the present invention, it is possible to transmit an emergency signal without reducing data transmission efficiency.

BEST MODE FOR CARRYING OUT THE INVENTION

First, a plurality of subcarriers forming a multicarrier signal will be explained. Here, for ease of the explanation, as shown in FIG. 1, a multicarrier signal is formed with subcarriers f1 to f15.

Amongst subcarriers f1 to f15 forming the multicarrier signal shown in FIG. 1, subcarriers f4 to f12 serve as the subcarriers (hereinafter "occupied carriers") to which data signals, control signals and pilot signals (hereinafter "regular signals") are mapped.

Amongst occupied carriers f4 to f12, a mobile station does not map regular signals to subcarrier f8 of the center subcarrier of the multicarrier signal, hereafter, to a DC carrier is referred as to the center subcarrier, because received quality in a base station deteriorates due to the influence of DC offset. That is, the subcarriers that the mobile station uses to transmit regular signals to the base station are eight subcarriers f4 to f7 and f9 to f12, out of nine occupied subcarriers f4 to f12.

Figure 1:
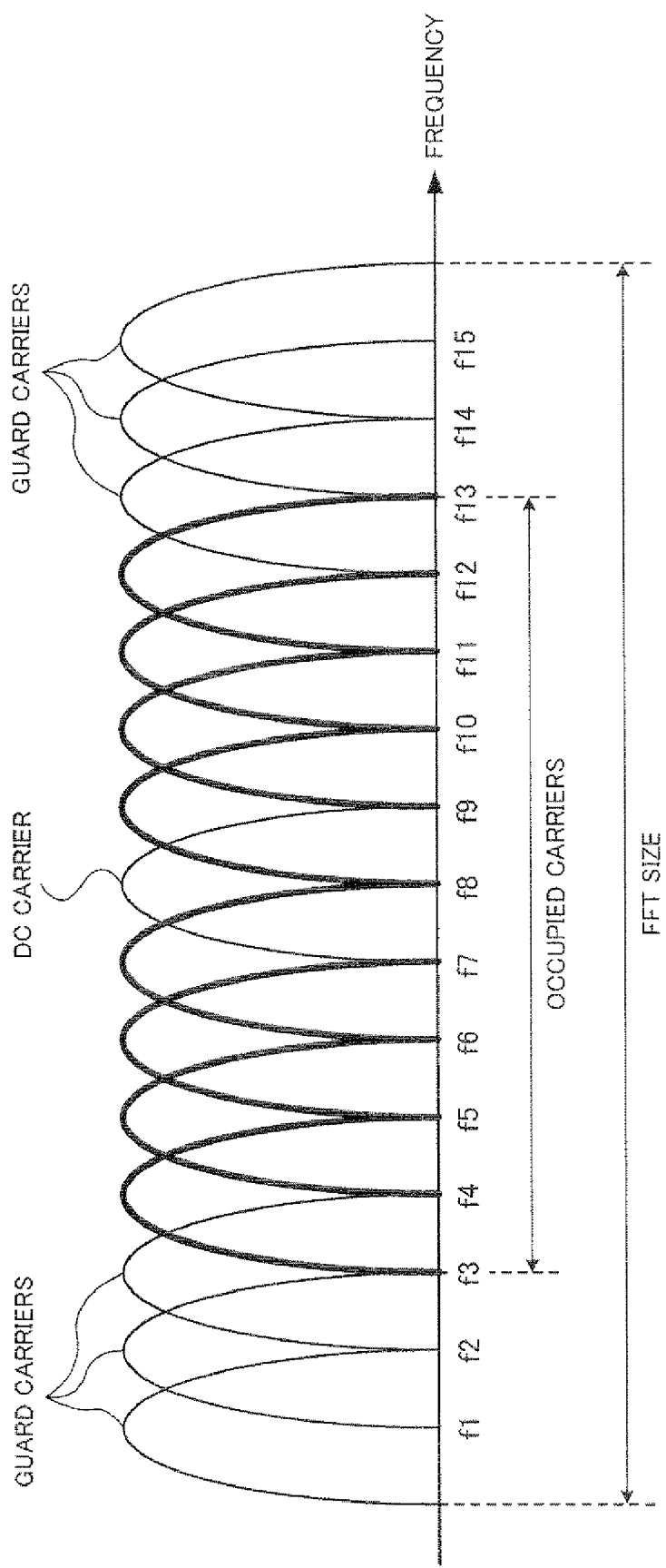
FIG. 1 shows the subcarrier configuration of a multicarrier

Further, as shown in FIG. 1, the FFT (Fast Fourier Transform) size, which is the range of frequencies an FFT is performed on, is the frequency band f1 to f15, which is equal to a frequency band of the multicarrier signal. Consequently, although the base station performs an FFT for subcarriers including the DC carrier to which a regular signal is not mapped, conventionally, the DC carrier is discarded without demodulation. That is, conventionally, the DC carrier is discarded without demodulation although it is received in the base station.

Further, amongst subcarriers f1 to f15 forming the multicarrier signal, subcarriers f1 to f3 and f13 to f15 other than the occupied subcarriers are provided on both sides of the occupied subcarriers to reduce interference to neighboring cells and referred to as "guard carriers." Consequently, the mobile station does not map regular signals to guard carriers. Further, similar to the DC carrier, the base station performs an FFT for subcarriers including guard carriers to which a regular signal is not mapped, conventionally, the guard carriers are discarded without demodulation. That is, conventionally, the guard carriers are discarded without demodulation although they are received in the base station.

In this way, conventionally, amongst a plurality of subcarriers forming a multicarrier signal, there are subcarriers discarded without demodulation although they are received in the base station.

Here, the mobile station does not map regular signals to guard carriers and a DC carrier just to receive the regular signals without an error. That is, guard carriers and a DC carrier are the subcarriers that can be demodulated in the base station only if the mobile station maps signals.

Further, as described above, emergency signal is transmitted to the base station when an emergency happens to a mobile station user, and the biggest purpose of transmitting emergency signals is to report that the mobile station user is in a state of emergency. In other words, the mobile station may only have to report that an emergency happens to the mobile station user via the emergency signal. Therefore, an emergency signal is different from a regular signal, and the received quality of the emergency signal does not matter as long as the emergency signal is received in the base station.

Further, in all communication time periods in an overall communication system, an emergency where an emergency signal should be transmitted occurs very few. Further, the most important purpose of transmitting an emergency signal is to report that a mobile station user is in a state of emergency, and therefore, the time that is spent to transmit emergency signals is only a fraction compared to the entire communication time in the overall communication system. Therefore, when a mobile station transmits emergency signals, the emergency signals little interfere with regular signals, and, the emergency signals have little influence on the overall communication system.

Then, with the present invention, an emergency signal is mapped to specific frequencies to which a regular signal is not mapped, for example, guard carrier frequencies or a DC carrier frequency, and transmitted in a multicarrier signal frequency band.

Now, embodiments of the present invention will be described in detail with reference to the accompanying drawings.

(Embodiment 1)

With the present embodiment, an emergency signal is mapped to guard carrier frequencies.

Figure 2:
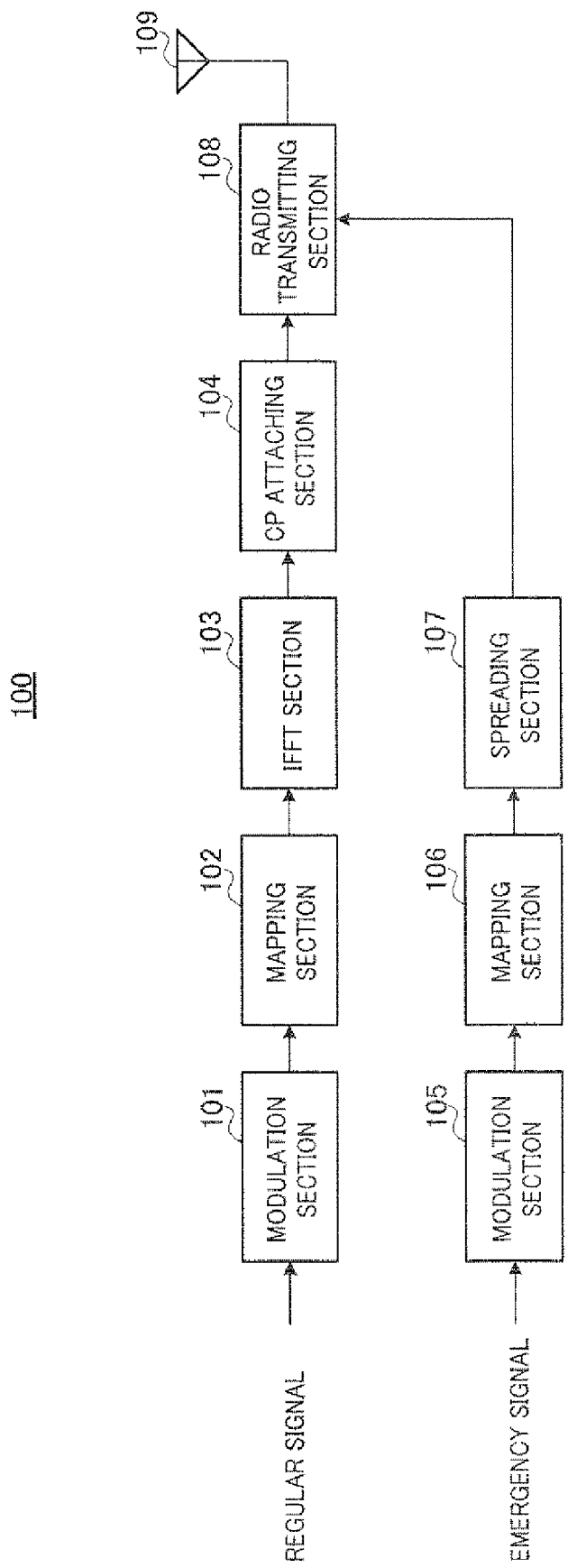
FIG. 2 is a block diagram showing the configuration of the mobile station according to Embodiment 1 of the present invention.

FIG. 2 shows the configuration of mobile station 100 according to the present embodiment.

In mobile station 100, modulation section 101 receives a regular signal as input. Modulation section 101 modulates the regular signal received as input, to generate regular signal symbols, and outputs the regular signal symbols to mapping section 102.

Mapping section 102 maps the regular signal symbols to subcarriers other than the guard carriers and the DC carrier, amongst a plurality of subcarriers, and outputs the mapped regular signal symbols to IFFT (Inverse Fast Fourier Transform) section 103.

IFFT section 103 performs an IFFT on a plurality of subcarriers, to generate an OFDM symbol as a multicarrier and outputs the generated OFDM symbols to CP (Cyclic Prefix) addition section 104.

CP attaching section 104 attaches the same signal as the tail part of the OFDM symbol received as input from IFFT section 103, to the beginning of that OFDM symbol, as a CP, and outputs the OFDM symbol with a CP to radio transmitting section 108.

Modulation section 105 receives an emergency signal as input. Modulation section 105 modulates the emergency signal received as input, to generate emergency signal symbols, and outputs the generated emergency signal symbols to mapping section 106.

Mapping section 106 maps the emergency signal symbols received as input from modulation section 105, to guard carrier frequencies, to which a regular signal is not mapped, and outputs the mapped emergency signal symbols to spreading section 107.

Here, transmission power of a mobile station is less than the transmission power of a base station, and therefore, when the mobile station is located outside the cell range of the base station, that is, when the mobile station is located outside communication area, the situation occurs where, while the mobile station can receive a signal from the base station, the base station nevertheless cannot receive a signal from the mobile station. It is preferable that the base station can certainly receive an emergency signal from the mobile station even in this case. Then, spreading section 107 spreads the emergency signal symbols received as input from mapping section 106 using a spreading code for an emergency signal, and outputs the spread emergency signal symbols to radio transmitting section 108. Spreading section 107 sets up a spreading code, whereby the base station can acquire an SNR (Signal to Noise Ratio) level that the base station can certainly receive the emergency signal, even when mobile station 100 is outside of the cell coverage area of the base station.

Radio transmitting section 108 performs transmitting processing including D/A conversion, amplification and up-conversion, on the OFDM symbol received as input from CP addition section 104 or the emergency signal symbols received as input from spreading section 107, and transmits the OFDM symbol and emergency signal symbols from antenna 109 to the base station.

Here, frequency mappings of a regular signal and an emergency signal will be explained using FIGS. 3 and 4.

Figure 3:
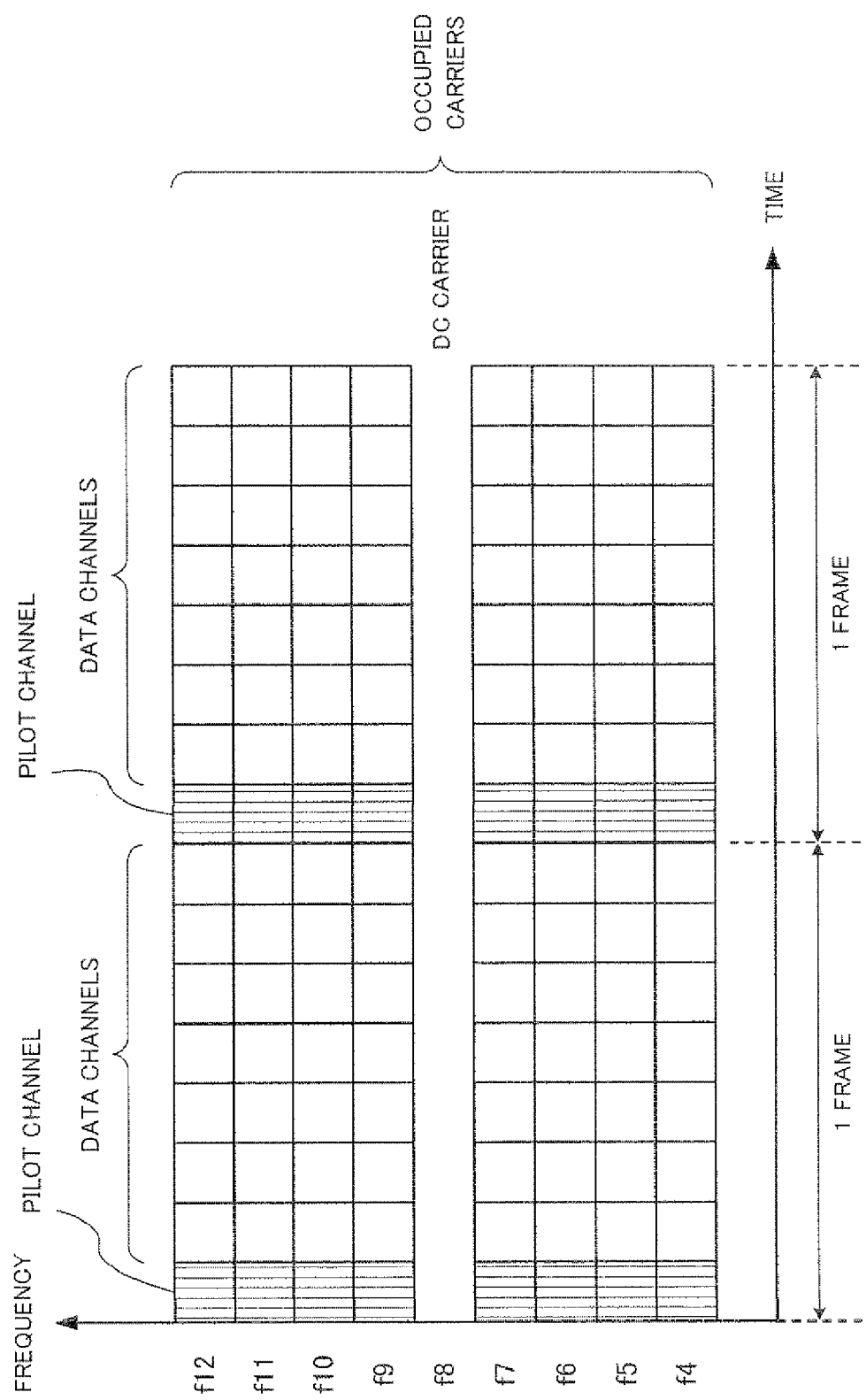
FIG. 3 shows a regular signal mapping example according to Embodiment 1 of the present invention.

As shown in FIG. 3, a regular signal is mapped to subcarriers f4 to f7 and f9 to f12 in FIG. 1 in mapping section 102. Here, as shown in FIG. 3, pilot channels and data channels form one frame for regular signals. Further, as shown in FIG. 3, mapping section 102 does not map a regular signal to DC carrier f8.

Figure 4:
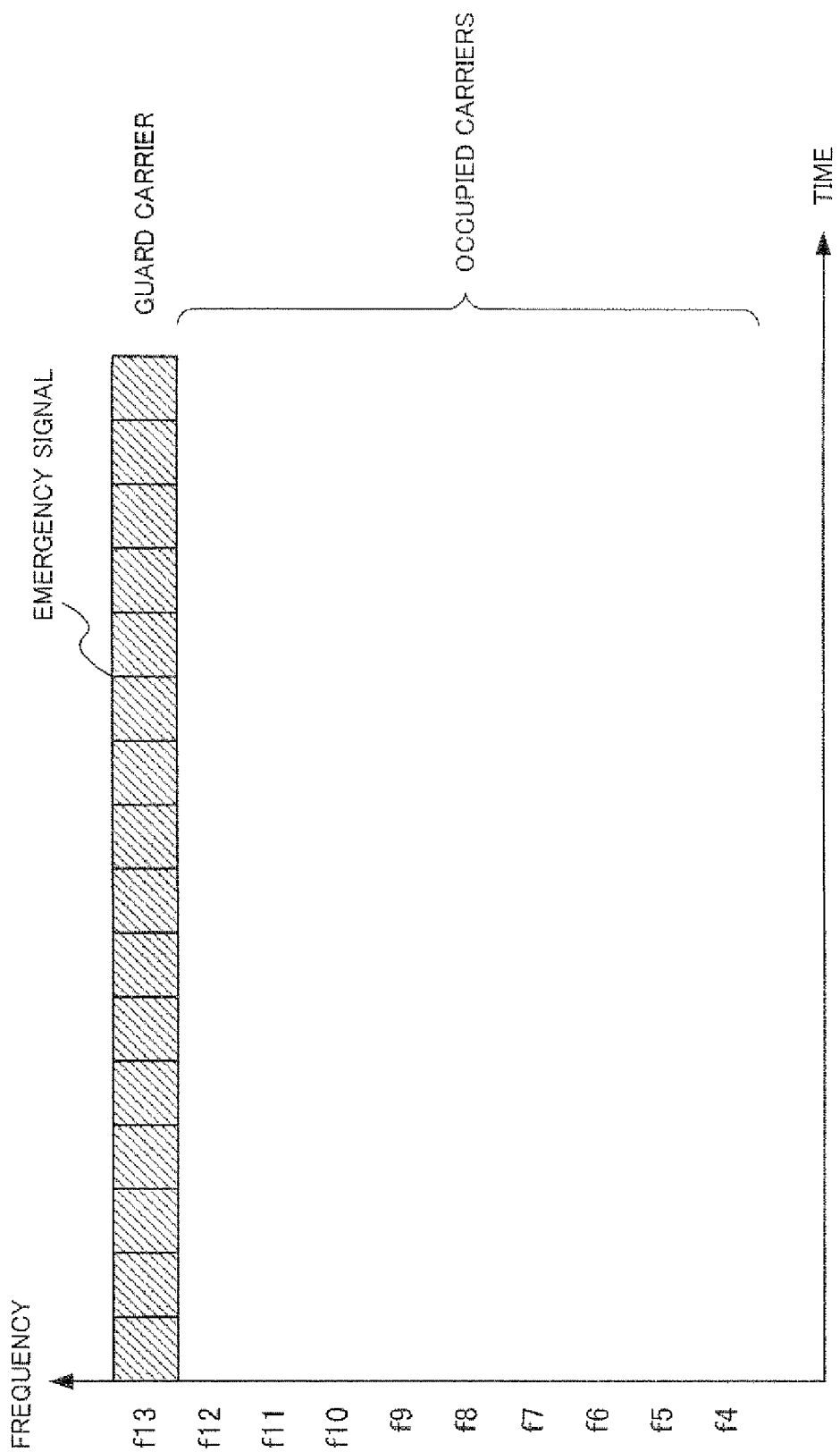
FIG. 4 shows an emergency signal mapping example according to Embodiment 1 of the present invention.

Meanwhile, as shown in FIG. 4, an emergency signal is mapped to guard carrier frequency f13 by mapping section 106 amongst guard carriers f1 to f3 and f13 to f15 shown in FIG. 1.

Further, as shown in FIG. 4, mapping section 106 does not map an emergency signal to frequencies other than the guard carrier frequency, f13. Consequently, upon transmitting an emergency signal, radio transmitting section 108 may perform transmitting processing for only the guard carrier frequency, f13.

Mapping section 106 may map an emergency signal to guard carrier frequencies f1 to f3, f14 and f15, besides guard carrier f13. That is, mapping section 106 maps an emergency signal to a guard carrier frequency out of a plurality of guard carriers in the multicarrier signal frequency band, f1 to f15.

Figure 5:
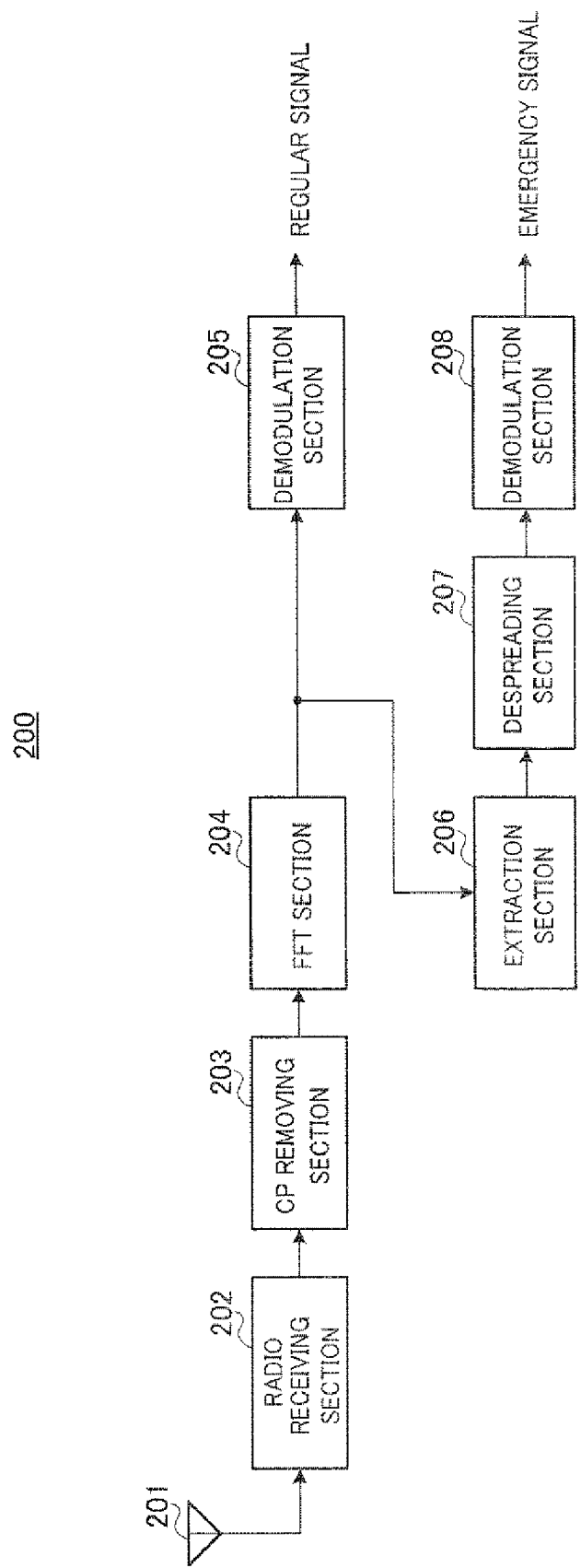
FIG. 5 is a block diagram showing the configuration of the base station apparatus according to Embodiment 1 of the present invention.

Next, base station 200 according to the present embodiment will be explained. FIG. 5 shows base station 200 according to the present embodiment.

In base station 200, radio receiving section 202 receives an OFDM symbol transmitted from a mobile station via antenna 201, performs receiving processing including down-conversion and A/D conversion on the OFDM symbol and outputs the OFDM symbol after receiving processing to CP removing section 203.

CP removing section 203 removes the CP from the OFDM symbol after receiving processing, and outputs it to FFT section 204.

FFT section 204 performs an FFT on the OFDM symbol received as input from CP removing section 203, and outputs the signal after the FFT to demodulation section 205 and extraction section 206.

Demodulation section 205 demodulates signals mapped to subcarriers f4 to f7 and f9 to f12, that is, demodulates regular signal symbols amongst the signals received as input from FFT section 204, to acquire a regular signal.

Extraction section 206 extracts signals mapped to guard carrier frequency, that is, extracts emergency signal symbol, amongst the signals received as input from FFT section 204, and outputs the emergency signal symbol to despreading section 207.

Despreading section 207 despreads the emergency signal symbol received as input from extraction section 206, and outputs the despread emergency signal symbol to demodulation section 208.

Demodulation section 208 demodulates the emergency signal symbol received as input from despreading section 207, to acquire an emergency signal.

Next, the signal (i.e. OFDM symbol) received in the base station will be explained.

When a plurality of mobile stations 100 transmit a regular signal only, base station 200 receives the signal shown in FIG. 3. At this time, base station 200 acquires a regular signal alone.

Figure 6:
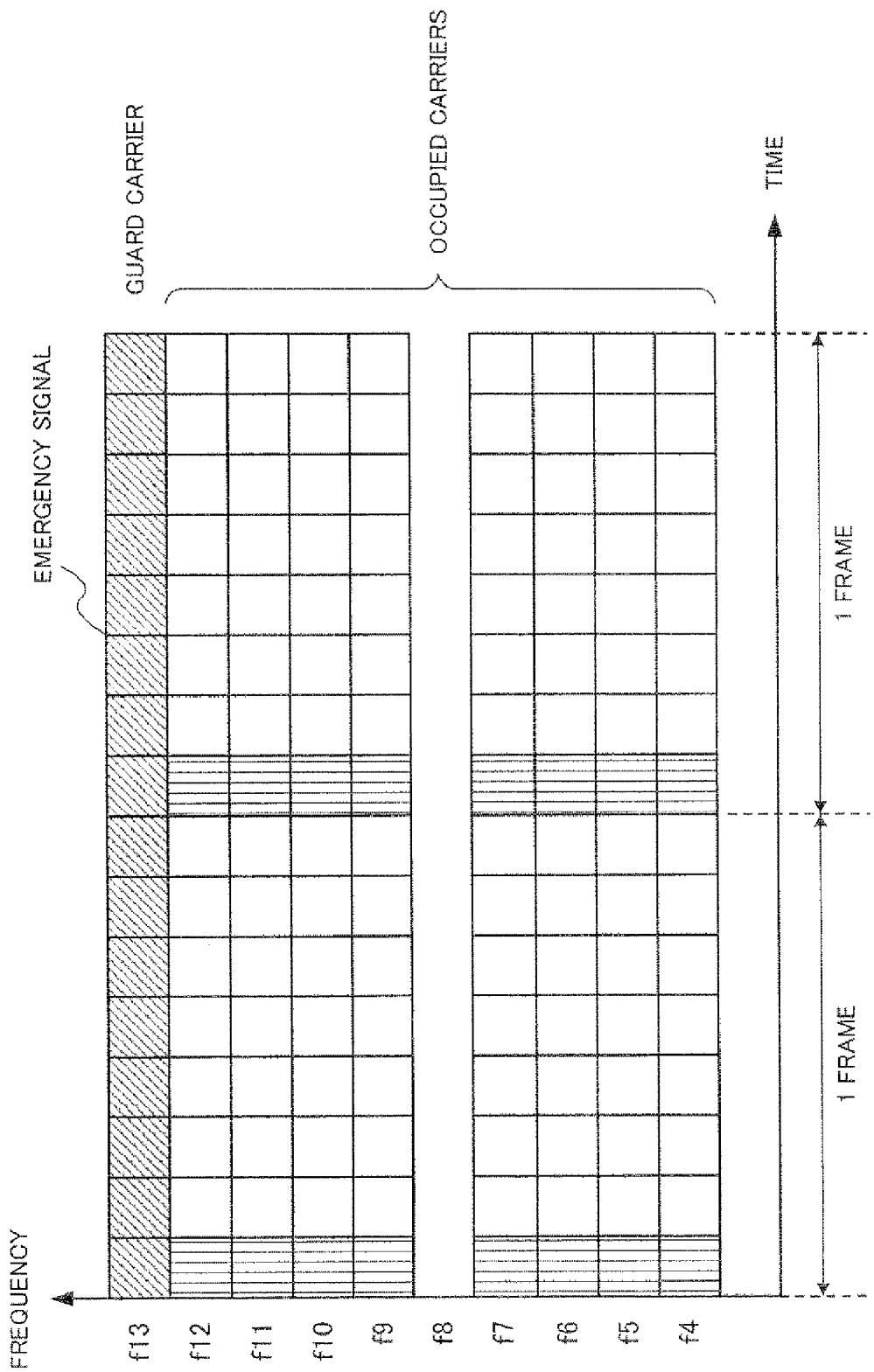
FIG. 6 shows an example of a received signal in the base station according to Embodiment 1 of the present invention.

On the other hand, when mobile station 100 that transmits a regular signal and mobile station 100 that transmits an emergency signal are present at the same time, base station 200 receives the signals shown in FIG. 6. As shown in FIG. 6, in the signal received in base station 200, a regular signal is mapped to subcarriers f4 to f7 and f9 to f12, and an emergency signal is mapped to guard carrier f13. Base station 200 demodulates the regular signal symbols similar to a case where base station 200 receives a regular signal alone, and, meanwhile, extracts the emergency signal symbol mapped to guard carrier f13, to demodulate it. Consequently, mobile station 100 that transmits a regular signal and mobile station 100 that transmits an emergency signal are present at the same time, base station 200 can acquire a regular signal and an emergency signal at the same time.

In this way, according to the present embodiment, in a multicarrier signal frequency band, an emergency signal is transmitted using a guard carrier that is not used to transmit a regular signal and that is nevertheless received at the base station. For this reason, it is possible to transmit and receive an emergency signal even when part of subcarriers for a regular signal is not kept for an emergency signal in advance. Therefore, according to the present embodiment, it is possible to transmit an emergency signal without reducing data transmission efficiency in multicarrier communications.

Further, according to the present embodiment, an emergency signal is spread, so that it is possible to transmit an emergency signal certainly to the base station even when a regular signal cannot arrive at the base station, for example, even when the mobile station is located outside the cell range.

Furthermore, according to the present embodiment, only adding a simple configuration (i.e. modulation section 105, mapping section 106, spreading section 107, extraction section 206, despreading section 207 and demodulation section 208) to the conventional mobile station and base station makes it possible to transmit and receive an emergency signal, Consequently, according to the present embodiment, it is possible to realize a mobile station and base station that is capable of transmitting and receiving an emergency signal at low cost.

(Embodiment 2)

The present embodiment differs from Embodiment 1 in mapping an emergency signal to the DC carrier frequency.

That is, the present embodiment differs from Embodiment 1 only in that mapping section 106 shown in FIG. 2 maps the emergency signal symbol received as input from modulation section 105 to the DC carrier frequency to which a regular signal is not mapped, and that extraction section 206 shown in FIG. 5 extracts the emergency signal symbol mapped to the DC carrier frequency in a signal received as input from FFT section 204.

Next, the frequency mapping of an emergency signal will be explained using FIG. 7. The frequency mapping of an regular signal is similar to the regular signal mapping in Embodiment 1 (FIG. 3).

Figure 7:
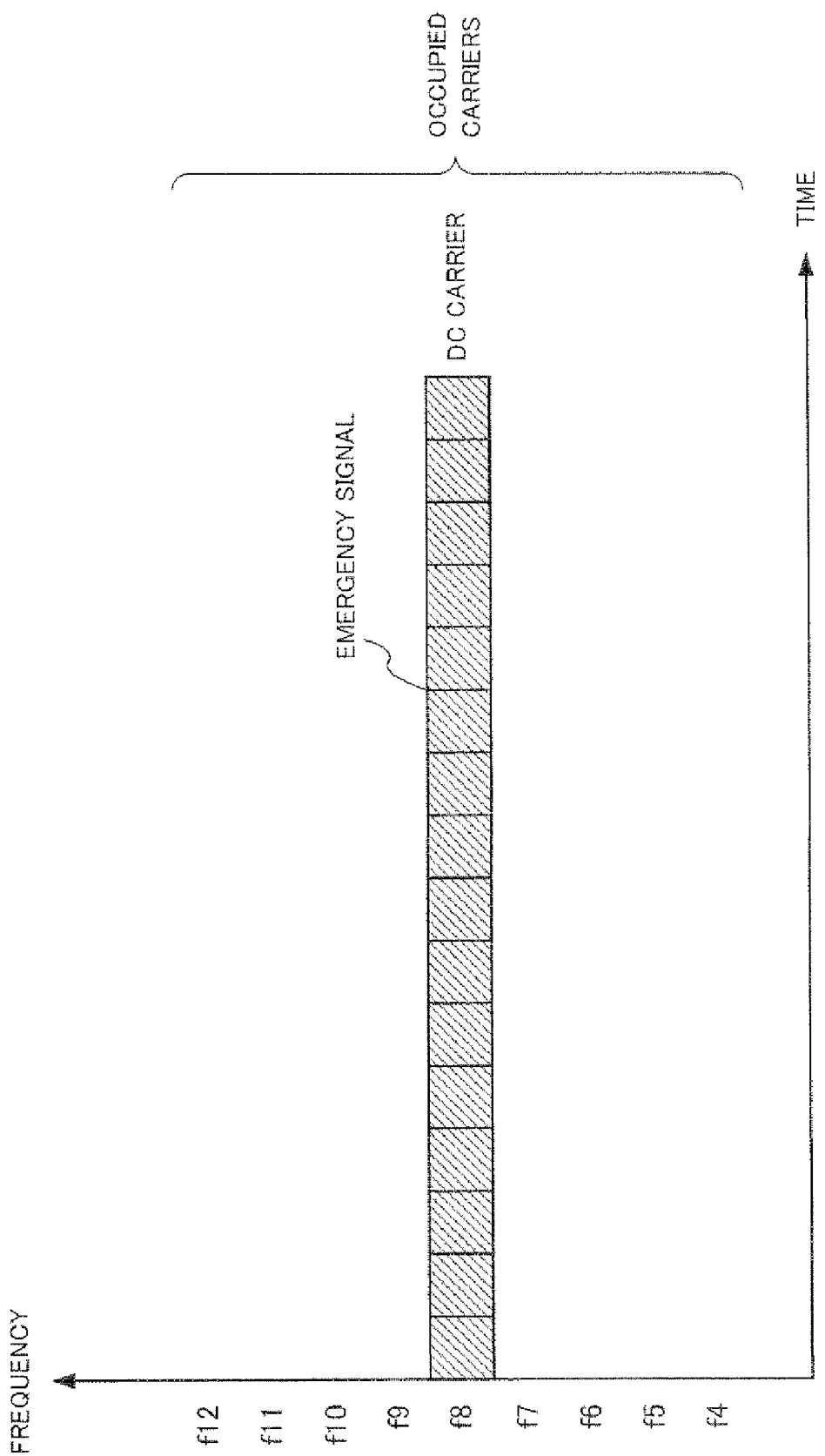
FIG. 7 shows the emergency signal mapping example according to Embodiment 2 of the present invention.

As shown in FIG. 7, an emergency signal is mapped to DC carrier frequency f8 shown in FIG. 1 by mapping section 106. Further, as shown in FIG. 7, mapping section 106 does not map an emergency signal to frequencies other than the DC carrier frequency, f8. Consequently, upon transmitting an emergency signal, radio transmitting section 108 may perform transmitting processing for only the DC carrier frequency, f8. In this way, mapping section 106 according to the present embodiment maps an emergency signal to the DC carrier frequency in the multicarrier signal frequency band, f1 to f15.

Next, the signal (i.e. OFDM symbol) received in the base station will be explained.

When a plurality of mobile stations 100 transmit a regular signal alone, the case is similar to Embodiment 1 (FIG. 3).

Figure 8:
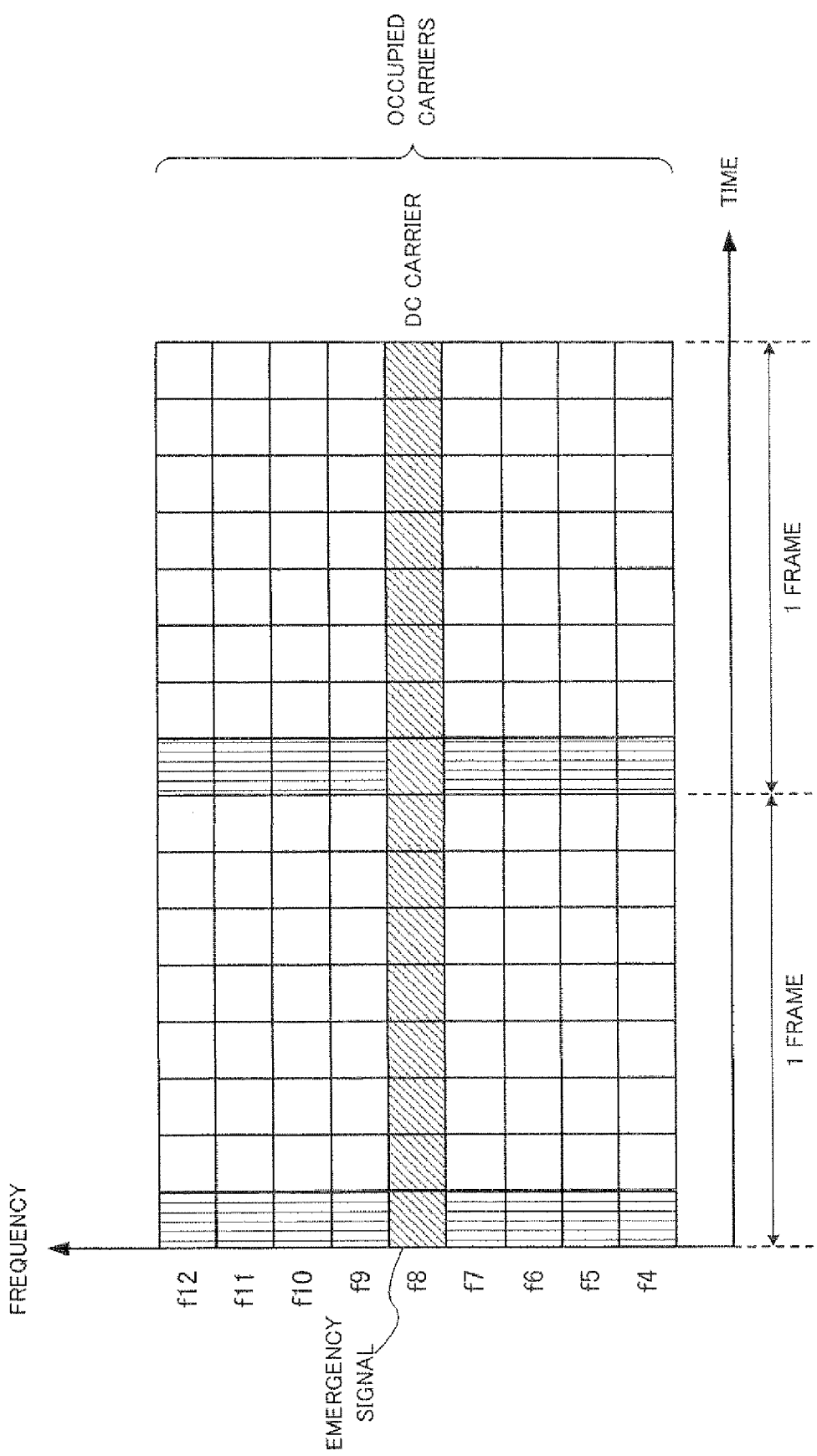
FIG. 8 shows an example of the received signal in the base station according to Embodiment 2 of the present invention.

On the other hand, when mobile station 100 that transmits a regular signal and mobile station 100 that transmits an emergency signal are present at the same time, base station 200 receives the signals shown in FIG. 8. As shown in FIG. 8, in the signal received in base station 200, a regular signal is mapped to subcarriers f4 to f7 and f9 to f12, and an emergency signal is mapped to DC carrier f8. Base station 200 demodulates the regular signal symbols similar to a case where mobile station 200 receives a regular signal only, and, meanwhile, extracts the emergency signal symbol mapped to DC carrier f8, to demodulate it. Consequently, mobile station 100 that transmits a regular signal and mobile station 100 that transmits an emergency signal are present at the same time, base station 200 can acquire a regular signal and an emergency signal at the same time.

In this way, according to the present embodiment, in a multicarrier signal frequency band, an emergency signal is transmitted using the DC carrier that is not used to transmit a regular signal and that is nevertheless received at the base station. For this reason, it is possible to transmit and receive an emergency signal even when part of subcarriers for a regular signal is not kept for an emergency signal in advance. Therefore, according to the present embodiment, as in Embodiment 1, it is possible to transmit an emergency signal without reducing data transmission efficiency in multicarrier communications. Further, according to the present embodiment, as in Embodiment 1, it is possible to transmit an emergency signal certainly to the base station. Furthermore, according to the present embodiment, it is possible to realize a mobile station and base station that is capable of transmitting and receiving an emergency signal at low cost.

Embodiments of the present invention have been explained.

With the mobile station in the embodiments, upon transmitting an emergency signal, the mobile station may stop a power supply to modulation section 101, mapping section 102, IFFT section 103 and CP attaching section 104, which are used for transmitting processing of a regular signal. By this means, upon transmitting an emergency signal, the mobile station can stop an IFFT circuit that consumes relatively great power, so that it is possible to reduce the consumption power greatly. Consequently, the mobile station can transmit an emergency signal in a longer time.

Further, although cases have been explained with the above embodiments where a signal transmitted and received between the mobile station and the base station is transmitted using OFDM scheme, this signal may be transmitted using transmission schemes including a single carrier scheme, other than the OFDM scheme. A single carrier scheme includes an SC-FDMA scheme adopted in 3GPP standardization. In the SC-FDMA scheme, an IFFT is performed for a signal on the frequency axis (in the frequency domain), so that it is possible to transmit an emergency signal mapped to the DC carrier frequency or guard carrier frequencies even when the signal is transmitted using the SC-FDMA scheme.

Further, although eases have been explained with the above embodiments to use the multicarrier signal shown in FIG. 1, for example, in 3GPP standard, an FFT size of 2048 subcarriers is set in a 20 MHz transmission bandwidth. Further, there are 1201 occupied carriers, one of which is the DC carrier. Therefore, 847 subcarriers other than the occupied carriers are guard carriers.

Further, although cases have been explained with the above embodiments where an emergency signal is spread, an emergency signal needs not be spread when the base station needs to receive only an emergency signal from a mobile station located in a cell range. Consequently, in this case, spreading section 107 (FIG. 2) and despreading section 207 (FIG. 5) are not necessary.

Further, although cases have been explained with the above embodiments where a radio communication apparatus of the emergency signal transmitting side is a mobile station and a radio communication apparatus of the emergency signal receiving side is a base station, by adopting the configuration shown in FIG. 2 in the base station and by adopting the configuration shown in FIG. 5 in the mobile station, it is possible to make a radio communication apparatus of the emergency signal transmitting side a base station and make a radio communication apparatus of the emergency signal receiving side a mobile station. If the emergency signal transmitting side is a base station and the emergency signal receiving side is a mobile station, it is possible to broadcast weather information including tsunami warnings and earthquake warnings and emergency information from the base station to a plurality of mobile stations.

Further, although cases have been explained with the above embodiments where an emergency signal is transmitted using either guard carriers or the DC carrier, it is possible to transmit an emergency signal using both guard carriers and the DC carrier. For example, it is possible to transmit a plurality of emergency signals by mapping the emergency signals to both guard carrier frequencies and the DC carrier frequency, and transmit an emergency signal while being hopped between guard carrier frequencies and the DC carrier frequency. By this means, it is possible to improve the diversity effect of emergency signals and receive the emergency signals certainly.

Further, whether to map an emergency signal to guard carrier frequencies or the DC carrier frequency may be selected depending upon the kind or content of the emergency signal. By this means, by deciding the position to which an emergency signal is mapped in the receiving side, it is possible to know the kind or content of the emergency signal in the receiving side without transmitting a signal related to the kind or content of the emergency signal additionally from the transmitting side to the receiving side. For example, in a case of low emergency, an emergency signal is mapped to guard carrier frequencies, and in a case of high emergency, an emergency signal is mapped to the DC carrier frequency. In this way, by transmitting an emergency signal using either guard carriers or the DC carrier depending upon the emergency level of the emergency signal, it is possible for the receiving side to know the emergency level without a signal for reporting the emergency level.

Further, in a TDD system, an emergency signal may be mapped to the DC carrier frequency in uplink and transmitted, and, an emergency signal may be mapped to guard carrier frequencies in downlink and transmitted. In this way, by making different frequencies to which an emergency signal is mapped between uplink and downlink, it is possible to prevent collisions between an uplink emergency signal and a downlink emergency signal and transmit the uplink emergency signal and the downlink emergency signal in a stable manner.

Further, a radio communication mobile station apparatus may be referred to as a "UE," a radio communication base station apparatus may be referred to as a "Node B," and a subcarrier may be referred to as a "tone." Further, a CP may be referred to as a "guard interval (GI)."

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-085387, filed on Mar. 28, 2007, including the specification, drawings and abstract, is incorporated herein by reference in its entirety.

INDUSTRIAL APPLICABILITY

The present invention is applicable to, for example, mobile communication systems.

The invention claimed is:
1. A radio communication apparatus comprising:
a mapper configured to map an emergency signal to a guard carrier or a DC carrier in accordance with an emergency level of the emergency signal; and a transmitter configured to transmit the emergency signal mapped to the guard carrier or the DC carrier, wherein in case of a low emergency level, which is a lower emergency level than a high emergency level, the mapper maps the emergency signal to the guard carrier, and in case of the high emergency level, the mapper maps the emergency signal to the DC carrier.

2. The radio communication apparatus according to claim 1, wherein the mapper maps the emergency signal to a specific frequency of the guard carrier.

3. The radio communication apparatus according to claim 1, wherein the mapper maps the emergency signal to specific frequency of the DC carrier.

4. The radio communication apparatus according to claim 1, further comprising a spreader configured to spread the emergency signal.

5. An emergency signal transmission method performed by a radio communication apparatus, the emergency signal transmission method comprising:

mapping an emergency signal to a guard carrier or a DC carrier in accordance with an emergency level of the emergency signal; and transmitting the emergency signal mapped to the guard carrier or the DC carrier, wherein in case of a low emergency level, which is a lower emergency level than a high emergency level, the emergency signal is mapped to the guard carrier, and in case of the high emergency level, the emergency signal is mapped to the DC carrier.

* * * * *